Aug. 18, 1936.    E. SILBERMANN    2,051,109
GAS TURBINE
Filed Aug. 30, 1932    2 Sheets-Sheet 1
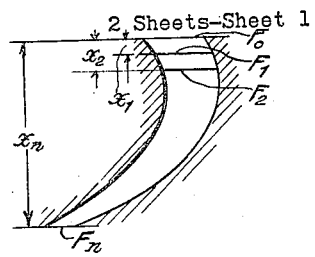
FIG.1.
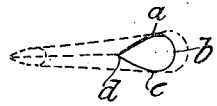
FIG.3.    FIG.2.
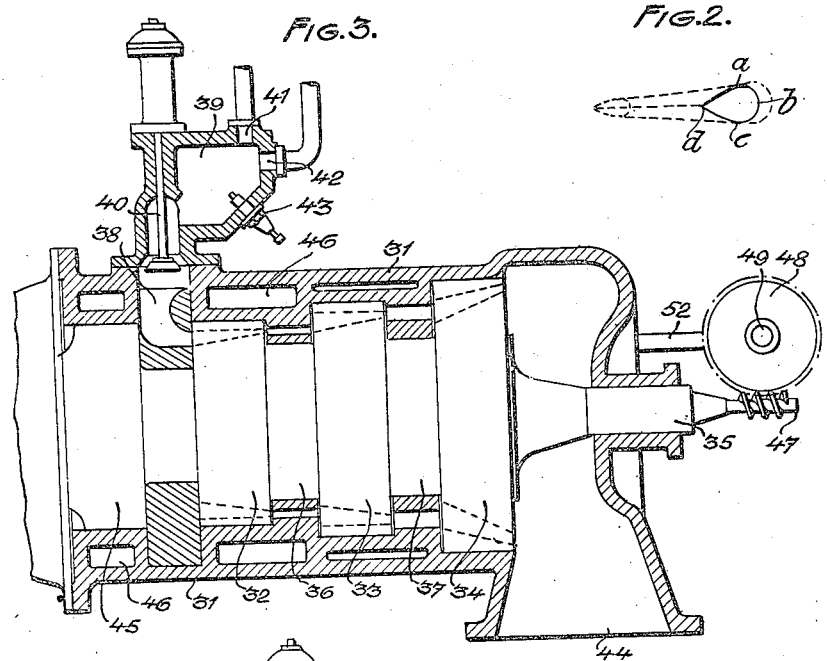
FIG.4.
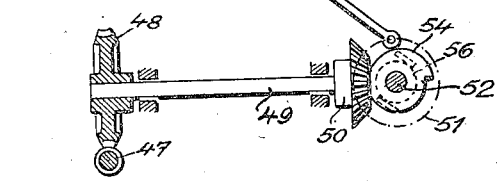
INVENTOR
EUGEN SILBERMANN
BY Rueger & Bayne
ATTORNEYS Aug. 18, 1936.   E. SILBERMANN   2,051,109
GAS TURBINE
Filed Aug. 30, 1932   2 Sheets-Sheet 2
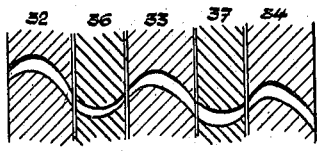
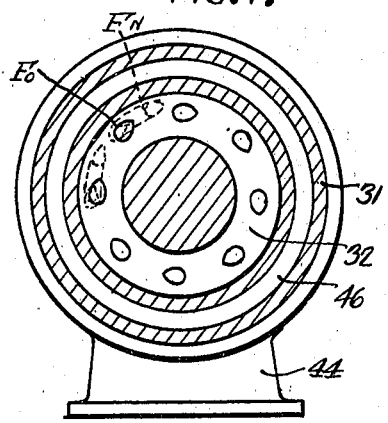
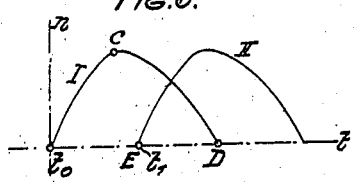
INVENTOR
EUGEN SILBERMANN Patented Aug. 18, 1936

2,051,109

UNITED STATES PATENT OFFICE 2,051,109

GAS TURBINE

Eugen Silbermann, Oradeamare, Rumania

Application August 30, 1932, Serial No. 630,995
In Germany March 16, 1931

1 Claim. (Cl. 253—59)

This invention relates to an explosion turbine and has for its object to improve very considerably the efficiency of such turbines, more particularly by thorough utilization of the energy of the driving medium within the channels or passages of the rotors.

In order to attain this object the turbine is constructed so as to produce a non-steady flow of the driving medium in the working channels of the rotor, that is to say a flow the speed of which constantly varies at every point in the channels.

Fig. 1 of the accompanying drawings shows diagrammatically and in longitudinal section a channel of a rotor the inlet aperture of which is denoted by $F_o$ and the outlet aperture of which is denoted by $F_n$. Fig. 2 is a plan view of the same diagrammatic representation.

Fig. 3 is a longitudinal section of a turbine constructed in accordance with this invention.

Fig. 4 is a detail view showing the controlling or governing gear for such a turbine.

Fig. 5 is a diagrammatic view of a series of channels as used herein.

Fig. 6 is a diagram illustrating the operation of a turbine constructed in accordance with the principles of this invention.

Fig. 7 is a cross section of the turbine showing the spiral passages.

Assuming that a charge of the driving medium, on entering the channel, fills out the space $x_1$ in the time $\Delta t_1$, and pressure, velocity, and temperature have the respective values $p_1$, $w_1$, and $T_1$, then, after the lapse of the time $\Delta t_2$ the driving medium has passed on to the cross-section $F_2$ of the channel. Since, however, the admission of driving medium is interrupted the above-mentioned quantity of this medium fills out the entire space $x_2$, the characteristic values having thereby dropped to $p_2$, $w_2$, and $T_2$. After the lapse of the time $\Delta t_n$ the driving medium fills out the entire channel, the values $p_n$, $w_n$, and $T_n$ being then valid for all parts of the channel. Thus in the time $\Delta t_n$ an alteration of these values has taken place at every cross-section of the channel. The next charge reaches the channel only when the pressure at the cross-section $F_o$ of the channel has dropped considerably. The intervals between the charges can be such that each portion of the driving medium passes into the channel only after the previous portion has already left it.

The action of the driving medium is threefold. The charge of driving medium forced into the channel first exerts a direct impulse upon the opposite wall of the channel, then acts by expansion, and finally, on leaving the channel, by reaction. And in this connection, the action, which is comparable to that in machines having revolving pistons, proves to be stronger the more the concave portion $a$—$b$—$c$ of the wall of the channel exceeds in magnitude the convex portion $c$—$d$—$a$ thereof.

The new method is thus essentially distinguishable from that hitherto adopted in which the flow of the driving medium in the channels is constant, and which is thus based on the validity of the equations $$Fw = \text{constant}$$

$$\frac{dw}{dt} = 0$$

in which, that is to say, at normal working for each portion of the channel there is a corresponding velocity of the driving medium which remains constant throughout the entire duration of the flow. In this case, and in contradistinction to the method according to the present invention, the output is dependent merely upon the initial and final condition of the driving medium (magnitude of the velocity of flow and of the angle of deflection), while the length of the channels and their cross-sectional configuration are without influence, if frictional effects be ignored, on the magnitude of the output.

The new method enables both a very large proportion of the temperature drop to be made effective within the machine itself, and also the energy liberated by the increase of volume on the exploding of the driving medium to be directly utilized, since the expansion immediately initiated prevents the pressure increasing through volumetric increase from becoming reconverted into heat. These circumstances have the further consequence that the machine becomes far less heated than is the case with the hitherto known gas turbines in which very considerable outflow velocities and temperatures are observable, such machines being for this reason not applicable as independent power units but only as parts of plant in which the heat of the cooling water is recovered. In contrast to these known types, turbines with non-constant flow in accordance with the present invention can be used as independent power units with a very high degree of efficiency.

The method according to the invention can be put into practice by gearing down the valve- or port-control shaft very low relatively to the rotor shaft in a turbine in which the rotor has very long working channels, and at the same time arranging that the quantity of the charges of the driving medium be so dimensioned that the flow remains non-constant. A suitable turbine for the carrying out of the invention is illustrated, by way of example, in the accompanying drawings.

Referring to the drawings the turbine is provided with a casing 31. To the shaft 35 there are attached three rotor wheels 32, 33, 34 between which there are arranged guide wheels 36, 37. The driving medium is supplied to the rotors by means of a nozzle ring 38 which is attached to the casing 31. To this ring the driving medium gains access from the combustion chamber 39 through actuation of a valve 40. The combustion chamber is provided with inlet apertures 41, 42 for the fuel and the compressed air, and a seating for the sparking plug 43. The exhaust gases escape through the pipe 44. For the taking-up of the axial thrust a disc 45 is provided on the shaft. The cooling is effected with the aid of the cooling jackets 46. The drive for the valve is derived from the shaft 35 of the turbine. To this shaft there is attached a worm 47 which drives the valve control shaft 52 through the intermediary of a worm wheel 48, a shaft 49, and bevel gear wheels 50, 51. To the shaft 52 there is keyed a cam disc 54 which coacts with the rockable valve-operating lever 55. Suitable means, indicated at 56, on the shaft 52 are used to drive any of the well known devices for controlling flow of current to the spark plug 43, it being deemed unnecessary to illustrate such a device as the same forms no part of the present invention as set forth in the claim.

The diagrammatically indicated rotor channels shown in broken lines in the drawings do not actually lie in the plane of the drawings but are curved in three dimensions.

The mode of operation of the turbine is such that a charge of driving medium supplied to the rotors performs work constantly in these channels during its entire passage therethrough. The next charge is introduced only after the preceding charge has left the rotor 34. By selection of suitably long reaction channels the number of the charges relative to the speed of rotation of the turbine shaft can be reduced to a very great extent, for example to 1:100, without making it necessary to employ fly-wheels or the like for the maintenance of the uniformity of the rotation of the rotors.

This reduction of the speed of the valve control shaft relatively to that of the turbine shaft results further in the possibility of permitting the turbine to run at very high speed, without the necessity for tolerating an inadmissible increase in the speed of operation of the valve gear. At the same time, the possibility of very high speed running enables the total weight of the turbine to be kept very low, so that these turbines are particularly suitable for aircraft.

Figure 6 diagrammatically illustrates the method of operating explosion turbines with an interrupted flow of the driving medium. The coordinates here used are:

$n$=number of revolutions
$t$=time

If the explosion I takes place at the moment $t_0$, the rotor is rotated by an impulse $f\tau$, wherein $f$=power
$\tau$=duration of the influence of the power. Assuming that there is no load on the turbine, the effect produced by the impulse is $$J\frac{w^2}{2}$$

wherein $w$=angular velocity
$J$=moment of inertia

The rotor should under no load conditions maintain the number of revolutions $$n=\frac{30w}{\pi}$$

at the high point on the curve ICD corresponding to "C", but as a result of the load, the effective energy decreases to zero at "D", where $w=0$. However, after a time $t_1$ a second impulse $f\tau$ takes place at E before the speed has dropped to 0 at D and so on.

I claim:

In a turbine of the kind described, a casing having an inlet port, a valve controlling said inlet port, a rotor having channels therein successively registering with said inlet port, each of said channels having its inlet end in advance of the outlet end in the direction of rotation of said rotor whereby the channel is of spiral formation with the outlet end inclined rearwardly with the respect to the rotation of said rotor, each of said channels being decreasingly tapered from the inlet end to the outlet end having its forward wall transversely arcuate and of greater superficial area than its rearward wall, and means to cause said valve to open and close during the passage of each channel past the inlet port, said means being arranged to admit gas during such time to each channel as only sufficient to partially fill the channel.

EUGEN SILBERMANN.